United States Patent [19]

Faulkerson

[11] Patent Number: 4,804,949

[45] Date of Patent: Feb. 14, 1989

[54] HAND-HELD OPTICAL SCANNER AND COMPUTER MOUSE

[75] Inventor: James L. Faulkerson, Woodside, Calif.

[73] Assignee: Everex Ti Corporation, Fremont, Calif.

[21] Appl. No.: 55,162

[22] Filed: May 27, 1987

Related U.S. Application Data

[63] Continuation-in-part of Ser. No. 28,311, Mar. 20, 1987, abandoned.

[51] Int. Cl.$^4$ .............................................. G09G 1/00
[52] U.S. Cl. .................... 340/710; 340/709; 250/221; 382/59; 235/472
[58] Field of Search ............... 382/11, 59; 340/710, 340/709; 250/221, 566; 358/294, 293; 235/472

[56] References Cited

U.S. PATENT DOCUMENTS

| | | | |
|---|---|---|---|
| 4,180,799 | 12/1979 | Smith | 382/59 |
| 4,364,035 | 12/1982 | Kirsch | 340/710 |
| 4,464,652 | 8/1984 | Lapson et al. | 340/710 |
| 4,521,772 | 6/1985 | Lyon | 340/710 |
| 4,581,761 | 4/1985 | Ichinokawa et al. | 382/59 |
| 4,631,400 | 12/1986 | Tanner et al. | 340/710 |
| 4,686,329 | 8/1987 | Joyce | 340/710 |

FOREIGN PATENT DOCUMENTS

| | | | |
|---|---|---|---|
| 0016400 | 10/1980 | European Pat. Off. | 382/59 |
| 6019284 | 1/1985 | Japan | 382/59 |
| 8301853 | 5/1983 | PCT Int'l Appl. | 382/59 |

OTHER PUBLICATIONS

Namba et al; "Toshiba OCR Hand Scanner, RH-520"; Toshiba Review, No. 113; Jan-Feb. 1978; pp. 23-25.

Primary Examiner—John W. Caldwell, Sr
Assistant Examiner—Mahmoud Fatahiyar
Attorney, Agent, or Firm—Roberts and Quiogue

[57] ABSTRACT

A hand-held peripheral device for a computer system or terminal having a video display is disclosed. The device is adapted to operate one of two user-selectable functional modes. In a first mode, the device functions as an optical scanner for image acquisition. In a second mode, the device functions as a computer mouse for controlling the position of a cursor on the video display.

6 Claims, 9 Drawing Sheets

HAND-HELD OPTICAL SCANNER AND COMPUTER MOUSE

This is a continuation-in-part of application Ser. No. 028,311, filed Mar. 20, 1987, now abandoned.

BACKGROUND OF THE INVENTION

The present invention relates to optical scanner devices useful for optical character recognition functions, and more particularly to a hand-held apparatus adapted to provide the dual function of optical character recognition for selective data entry and X-Y position indication for display cursor and computer control.

Optical scanners have become well known for optical character recognition (OCR) functions. Such scanners may take the form of hand-held devices coupled to a data receiving terminal, with the operator scanning the apparatus over an image, such as a bar code or line of text, so as to provide an electrical signal which represents a recognized character or sequence of characters. Such hand-held devices include the wand disclosed, for example, in U.S. Pat. No. 4,088,981. Caere Corporation, Los Gatos, California, is understood to market its PC Scanner System for reading bar codes with an optical scanner connected to an IBM personal computer.

Another type of hand-held control device which has come into common use in the past decade is the functional control device used with a computer-controlled display terminal, commonly referred to as a "computer mouse." The mouse is used as an indirect pointing device with an interactive display computer system to control cursor movement by manipulating the mouse over a work surface, the mouse providing relative X-Y position data to the computer system to control the position of the cursor on the display. Examples of such computer mouse devices are shown in U.S. Pats. 4,464,652 and 3,835,464.

The functions of the computer mouse are used extensively, for example, to control the operation of the MacIntosh personal computer marketed by Apple Computer, Inc., Cupertino, Calif. The operation of this computer is menu driven, with various pull-down menus display to the user, and a particular function selected by positioning the cursor over a desired function description or ikon.

The amount of space allocated to office workers engaged in data entry functions is limited due to budgetary and space productivity requirements. Heretofore, it has been necessary to provide a separate hand-held optical scanner wand device for attachment to a computer terminal device for optical character recognition, and if the computer terminal is so adapted, a separate computer mouse device for controlling the position of the cursor on the terminal and control the computer. The requirement for two separate peripheral devices to perform the two functions is inefficient in space usage. The use of separate peripheral devices is also inefficient in the sense of user productivity, since the user may in some applications be shifting between the optical scanner wand, the computer mouse device and device keyboard.

None of the optical scanners in use today are known to provide the capability of OCR scanning as well as the X-Y position and cursor control capability of the computer mouse. For many applications, it would be advantageous to provide a single apparatus for providing the dual function of OCR scanning and computer mouse operation.

SUMMARY OF THE INVENTION

The above objects and features are achieved in a combined hand-held optical scanner and X-Y position transducer apparatus. The apparatus comprises a housing suitable for hand-held use by an operator, and an optical scanning means contained within the housing for optically scanning images appearing on the surface of a document, page or the like, and providing electrical image signals representative of said images.

The apparatus further comprises an X-Y position transducer means for providing electrical position signals indicative of the relative X-Y movement of the housing in relation to the planar surface. Operator controlled function control keys for selectively actuating the optical scanning means or the position transducer are provided on the housing to allow the operator to selectively operate the apparatus in a first state wherein the apparatus is employed in an optical character recognition function or in a second state wherein the apparatus is employed in a movement transducer function.

In one embodiment the X-Y movement transducer comprises a rotatable ball for frictionally engaging a work surface, means coupled to the rotating ball for providing an X axis position signal in dependence on the relative rotation of the ball along the X axis, and means coupled to the rotating ball for providing a Y position signal in dependence on the relative rotation of the ball along the Y axis.

In another embodiment, the X-Y transducer comprises the optical scanner and a processor for processing the electrical image signals from the optical scanning means to derive movement information from the succession of images scanned by the scanner.

BRIEF DESCRIPTION OF THE DRAWINGS

These and other features and advantages of the present invention will become more apparent from the following detailed description of exemplary embodiments thereof, as illustrated in the accompanying drawings, in which.

DETAILED DESCRIPTION OF THE DISCLOSURE

Figure 1:
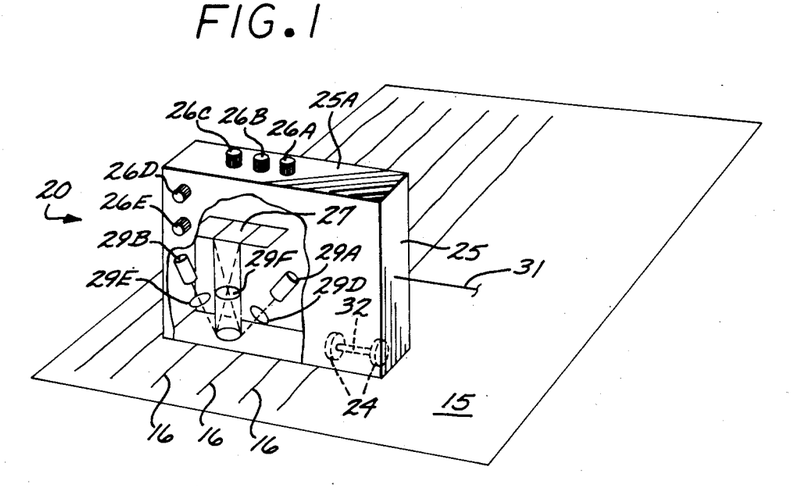
FIG. 1 is a partially broken-away perspective view of a first embodiment of an optical scanner/mouse device embodying the invention, positioned on a page surface for optical character recognition use.
Figure 2:
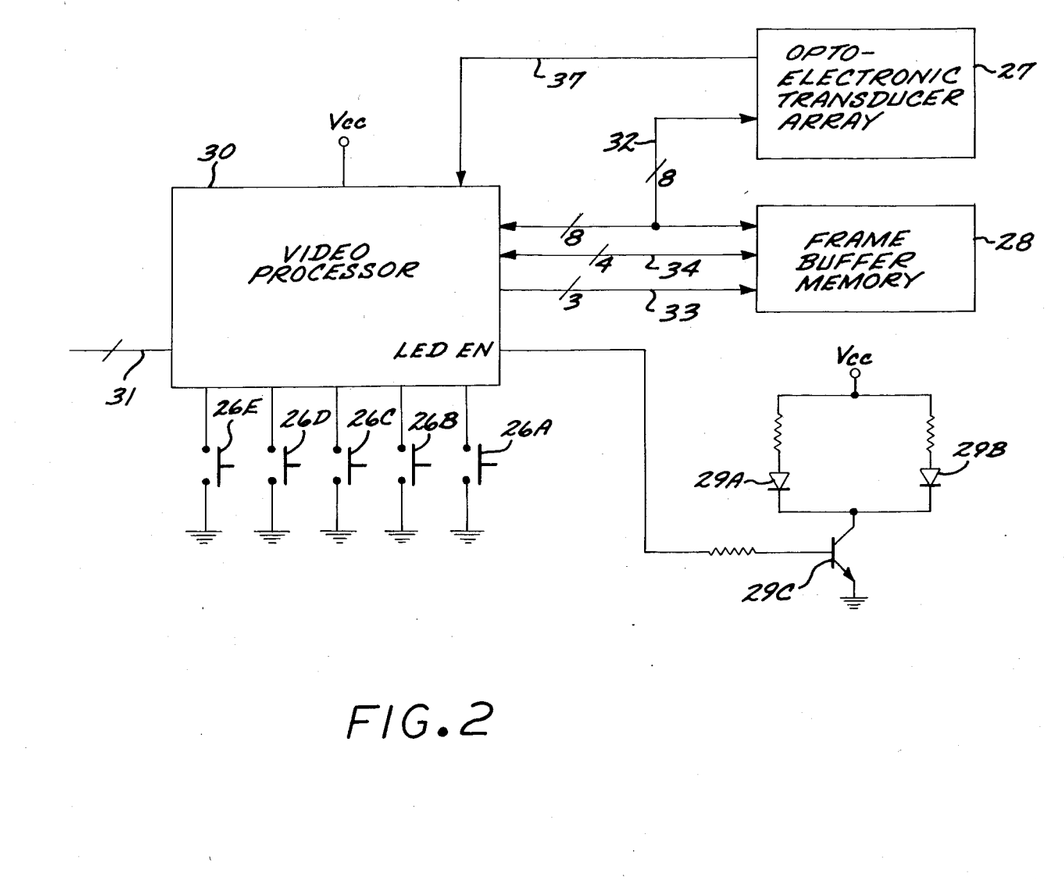
FIG. 2 is a block diagram showing electrical components of the device of FIG. 1.
Figure 3:
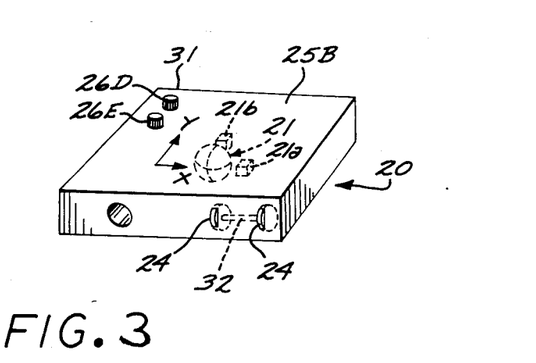
FIG. 3 is a perspective view of the device of FIG. 1, positioned on a work surface for X-Y position cursor control.

Referring now to FIGS. 1-3, a first embodiment of an optical scanner/computer mouse device 20 employing the invention is shown in two perspective views. In this embodiment, the device 20 takes the form of a housing 25 constructed for hand-held use by the system user. The housing 25 contains the optical elements and transducer utilized to capture images of the character data being scanned by the device.

The device 20 is positioned in the partially brokenaway diagrammatic perspective view of FIG. 1 for operation in an optical character recognition mode over a page 15 bearing several lines 16 of characters. The housing 25 contains an opto-electronic transducer 27 for optically and electronically capturing images of characters in a tangible medium, such as text which is printed, typed or handwritten on paper such as page 15.

The transducer 27 may comprise, for example, a 64×256 pixel photosensitive array for capturing successive optical image frames or frame segments. An exemplary commercial device suitable for use as the photosensitive array is the IS32A product marketed by Micron Technology, Inc., Boise, Idaho. This device is functionally a 64K dynamic random access memory, packaged to allow an image to be focused directly on the silicon die. Alternative transducers are available, such as CCD sensors.

The camera further comprises an internal light source for illuminating the surface of the medium bearing the characters. In this embodiment, the light source comprises two light emitting diodes (LEDs) 29A and 29B, arranged to direct the generated light via respective lens elements 29E and 29D onto the surface of the page 15 bearing the lines 16 of characters, such that light reflected therefrom is directed by lens 29F onto the transducer array 27. In this embodiment, lens elements 29D-E are plano-convex lens. The light source further comprises a driver circuit (not shown) capable of turning the LED devices on and off at a rapid repetition rate. Thus, the illumination source is in the form of a stroboscopic light source illuminating the medium surface.

With the stroboscopic light source in operation, as the device 20 is moved by hand along a line of characters, for example, a line of text printed on paper, light generated by the light source is projected onto the medium surface, and reflected therefrom onto the opto-electronic array, the intensity of the reflected light being spatially modulated in accordance with the particular character or characters being scanned. The opto-electronic array transforms the optical character data in the reflected light into digital data, with each pixel having a binary "1" or "0" associated therewith, with one value representing white and the other value representing black. After a frame has been captured by the array, the digital image data may be read out of the array as a sequence of digital video data. The video data represents a sequence of image frames or frame segments, each comprising a video image data packet and an associated packet of device "housekeeping" or status data.

The system 20 further comprises a video processor 30 which receives the digital video data representing each image or frame from the opto-electronic transducer 27. The video processor 30 is more fully described in pending application Ser. No. 048,100, entitled "Adaptive Image Acquisition System," filed on May 8, 1987, and assigned to the assignee of this application. The entire contents of this co-pending application is incorporated herein by this reference. The video processor 30 controls the camera exposure control function and performs correlation functions on the successive frames of the video data to provide a sequence of edited video data frames or frame segments, in the form of a data packet for each frame or frame segment, wherein duplicative character data have been removed from the edited frames. The result is video data representing a sequence of frames or frame segments, analogous to a "filmstrip," which capture the character sequence, but which do not contain duplicative character data. Preferably, the video processor 30 is embodied in one or more integrated circuits contained within the housing of the hand-held device 20, although it may be located at an external location. The output of the processor 30 comprises a digital bit stream of packets of video image data and associated device status data packets.

The device 20 (FIG. 1) further comprises a plurality of camera function keys 26A-26E which are positioned to allow tactile operation by the user. These keys may comprise, for example, normally open spring-biased pushbutton switches. The status of the keys is monitored, and the event of key closure or release results in issuance of a particular key token signal corresponding to the particular key.

The edited video data from the video processor 30 and device function key status signals representing the status of the function keys 26A-26E (FIG. 1) are respectively coupled via a multi-wire electrical cable 31 to the particular utilization device, typically a computer system.

Referring now to FIG. 2, a block diagram of the main electrical elements of device 20 of FIG. 1 is shown. In this diagram the video processor 30 is shown in the form of an integrated circuit located within the housing of the device 20. The device 20 comprises the opto-electronic transducer array 27 and a frame buffer memory 28, which are coupled to the video processor 30 by address bus 32. A control bus 33 between the video processor and the frame buffer 28 provides the control lines needed for the processor 30 to control the frame buffer 28. Serial video data is transferred from array 27 to processor 30 over line 37.

The cooperation of the array 27 and frame buffer 28 permits the video processor 30 to perform a correlation process between successive image data frames to eliminate duplicative character information. The frame buffer is employed to store the three most current frames of image data. By comparing two successive data frames resulting from scanning of the camera along a line of character text, for example, the image data which is overlapped between the two frames, i.e., duplicated, or frame segment may be identified so that an edited image frame may be constructed which contains only new image data, i.e., data not captured in the previous data frame. The edited frame data is then transmitted via cable 31 for further processing as described below.

The video processor 30 also controls the camera light source, which comprises in this embodiment two light emitting diodes (LEDs) 29A and 29B. The video processor controls the application of DC power to the LEDs 29A and 29B by gating transistor 29C on and off. Thus, the processor 30 may control the duty cycle and repetition rate at which the LEDs are operated. Each cycle comprises a programmable "soak" time period during which the LEDs are turned on to illuminate the medium, a "read" period during which the pixels of the array 27 are read, a refresh time period during which unused array pixels are refreshed, and a programmable wait time period. The light source illuminates the medium only during the "soak" interval; since the transducer array is not illuminated with reflected light during the array "read" time period, blurring of the resultant image is reduced. The "soak" time period, i.e., the time period during each cycle that the array 27 is exposed to the scanned image, is adjusted as a function of the reflective characteristics of the medium.

Power is transferred to the elements of the device 20 (FIG. 1) via cable 31, and device data signals are transferred via cable 31 to the computer system or terminal. Alternatively, the electrical umbilical cable 31 may be replaced with a wireless infrared link, wherein the digital information to be exchanged between the device 20 and the computer system is modulated on an infrared carrier, and the information is subsequently decoded. In this alternate arrangement, the device 20 receives its electrical power from a self-contained battery pack.

The device 20 further comprises a pair of tracking wheels 24 (FIG. 1) mounted for rotation about axis 32. In the position shown in FIG. 1, these tracking wheels engage the surface of sheet 15, and serve to assist the user in tracking the device 20 along a line 16 of text.

Referring now to FIG. 3, the device 20 is shown in position relative to page 15 to perform a computer mouse X-Y movement transducing function. In this position, a floating ball 21 mounted in a socket in the side of the housing 25 facing the surface 15 frictionally engages the surface 15, and is rotated as the user slides the device 20 over the work surface to position the computer terminal cursor as desired. Frictionally coupled to the ball 21 are a pair of transducers 21a, 21b mounted orthogonally to detect rotation of the ball about two orthogonal axes representing the coordinate X and Y axes (shown in FIG. 3 relative to the housing 25). The ball and transducers serve to translate the compound movement of the device 20 over the surface of the page 15 into compound X and Y cursor position signals for the computer. The particular orientations of the X and Y axis are a matter of choice.

The device 20 includes a first plurality of OCR mode function control switches 26A-26C, located on surface 25A of housing 25 readily accessible to the user when the device 20 is positioned for OCR use as shown in FIG. 1, and a second plurality of position mode function control switches 26D-26E, positioned on surface 25B of housing 25, readily accessible to the user when the device 20 is positioned for computer mouse, cursor control use as shown in FIG. 3. These first and second pluralities of control switches enable the user to conveniently activate the desired mode of operation of the device 20, i.e., either the OCR scanner mode or the computer mouse cursor control mode.

The use of a rotatable ball and associated movement transducers in a computer mouse device to provide signals indicative of the X-Y movement of the mouse over a work surface is well known in the art. An exemplary structure is described in U.S. Pat. No. 4,464,652, and other U.S. patents are referenced therein including numbers 3,541,541; 3,269,190; 3,834,464; 3,982,963 and 3,541,521 as showing other cursor control devices. The disclosure of U.S. Pat. No. 4,464,652 is incorporated herein by reference.

Referring now to FIGS. 4–8, a second embodiment of an optical scanner/computer mouse device is disclosed. This device 120 is adapted for use in both the OCR mode and computer mouse modes while disposed in the same position relative to the medium bearing the characters or the work surface. Here the X-Y transducer comprises the opto-electronic imaging array. It is known to employ signal correlation processing of successive images or "bit maps" of a work surface to provide an output indicative of the direction and amount of movement of the cursor control device relative to an optical contrasting input to the array; U.S. Pat. No. 4,521,772 discloses such a computer mouse device. U.S. Pat. No. 4,546,347 discloses another computer mouse device employing an optical position transducer instead of a mechanical position transducer arrangement. The disclosures of U.S. Pat. Nos. 4,521,772 and 4,546,347 are incorporated herein by reference.

Thus, the invention may alternatively be implemented using an optical X-Y movement transducer instead of a mechanical transducer. Separate signal processing is provided to process the image data provided from the imaging array and to generate the X-Y movement information. The function controls on the device select the device operating mode, and hence the signal processing to be performed on the image data, i.e., OCR processing or X-Y position processing.

Figure 4:
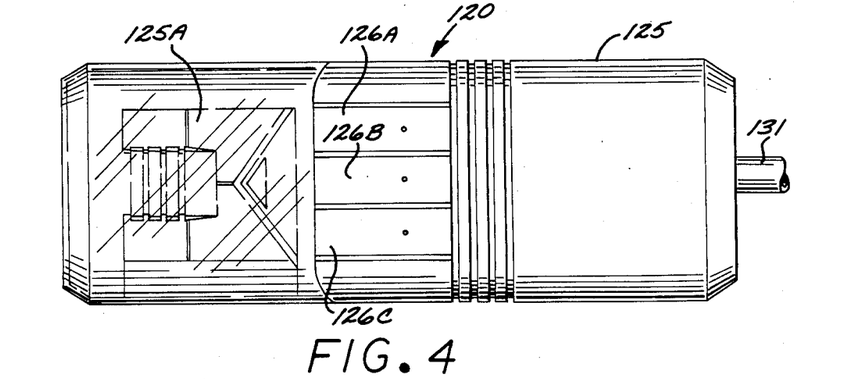
FIG. 4 is a top view of a second embodiment of an optical scanner/mouse device embodying the invention.
Figure 5:
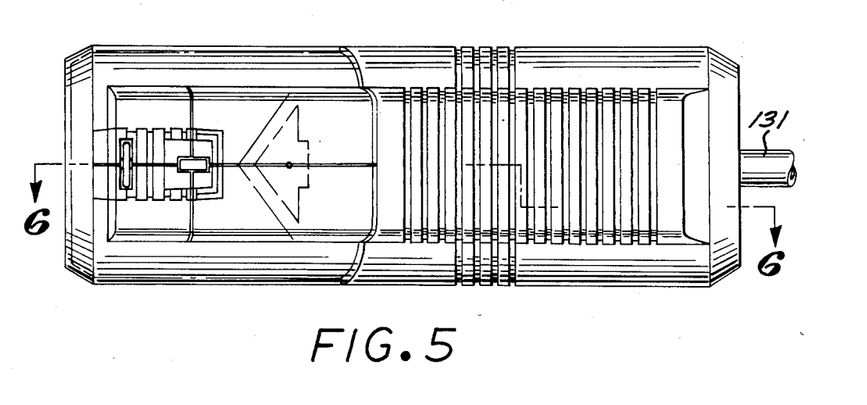
FIG. 5 is a bottom view of the embodiment of FIG. 4.
Figure 6:
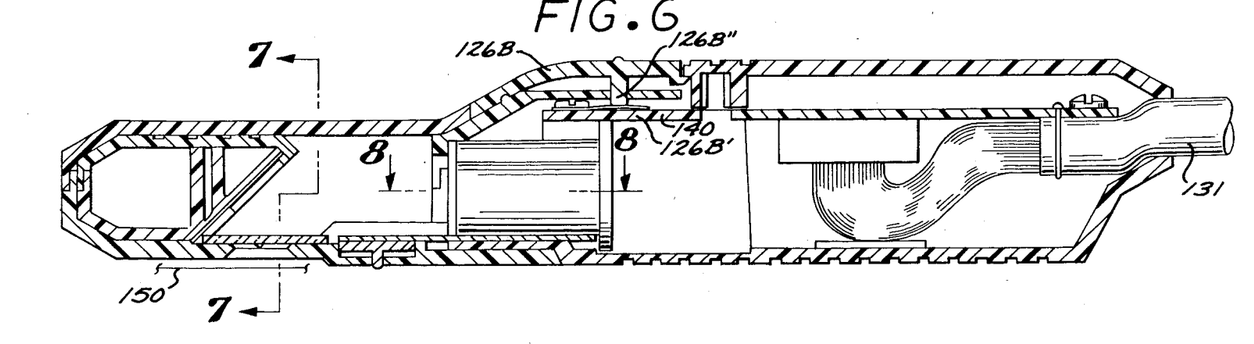
FIG. 6 is a longitudinal cross-sectional view of the embodiment of FIG. 4.

Device 120 comprises a housing 125, with a plurality of user-actuated switches 126A-C disposed along an upper surface thereof (FIG. 4). A section 125A of the housing 125 is fabricated of a transparent material to enable the user to view the area of the page bearing the lines of characters during OCR use.

Figure 7:
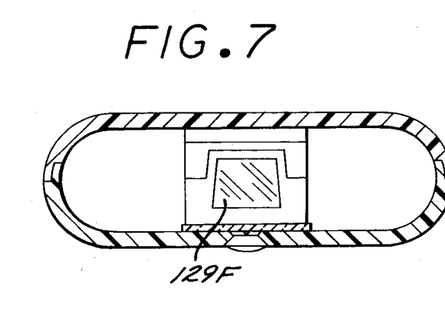
FIG. 7 is a cross-sectional view of the second embodiment, taken along line 7—7 of FIG. 6.
Figure 8:
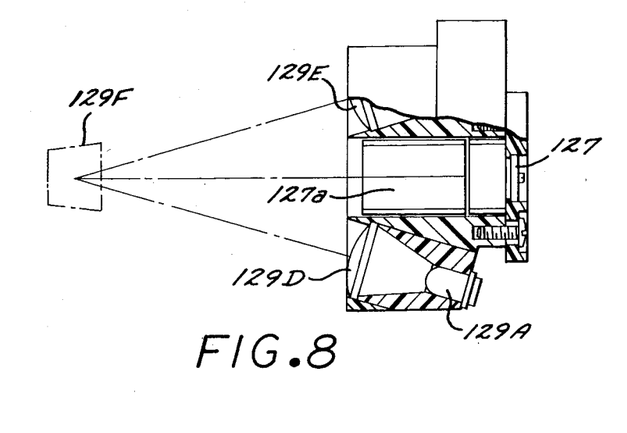
FIG. 8 is a partially broken-away cross-sectional view of the second embodiment, taken along line 8—8 of FIG. 6, showing the optical elements of the device.

FIGS. 7 and 8 illustrate the primary optical elements of the device 120. The light source of this embodiment comprises a pair of LEDs (only LED 129A is visible in the partially broken-away cross-sectional view of FIG. 8) and converging lens elements 129D and 129E. The LEDs and lens elements are arranged to direct the generated light onto folding mirror 129F for reflection onto the surface 150 over which the device 120 is being scanned. The reflected light from surface 150 is in turn reflected by mirror 129F through lens 127a onto the imaging array 127.

The electrical umbilical cable 131 is connected to printed wiring board 140, which serves to distribute electrical power and data signals between cable 131, function controls 126A-C, LEDs 129A, 129B, and imaging array 127.

The function controls 126A-C preferably comprise spring-biased switches which in the closed position depress a metal spring contact into contact with a printed wire contact point on board 140. For example, switch 126B is disclosed in FIG. 6, and comprises metal spring contact 126B' having one end which may be urged into contact with board 140 by function control stud 126B".

One of the function controls 126A-C may be employed to provide a mode selection signal for selecting the OCR mode, and another of the function controls employed to provide a mode selection signal for selecting the computer mouse mode.

Figure 9A:
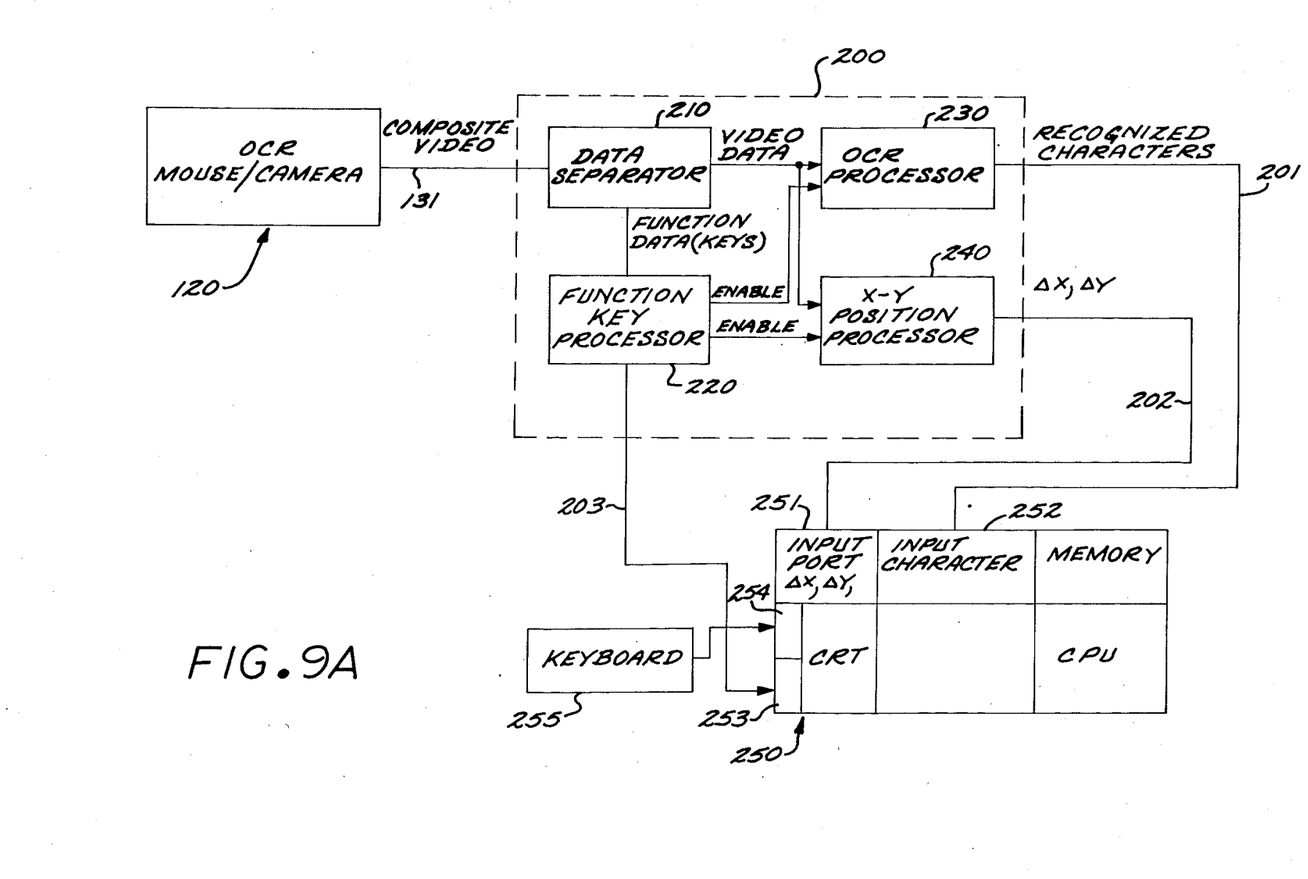
FIG. 9A is a block diagram of a computer work station employing the second embodiment of the OCR scanner/computer mouse device shown in FIGS. 4-8.
Figure 9B:
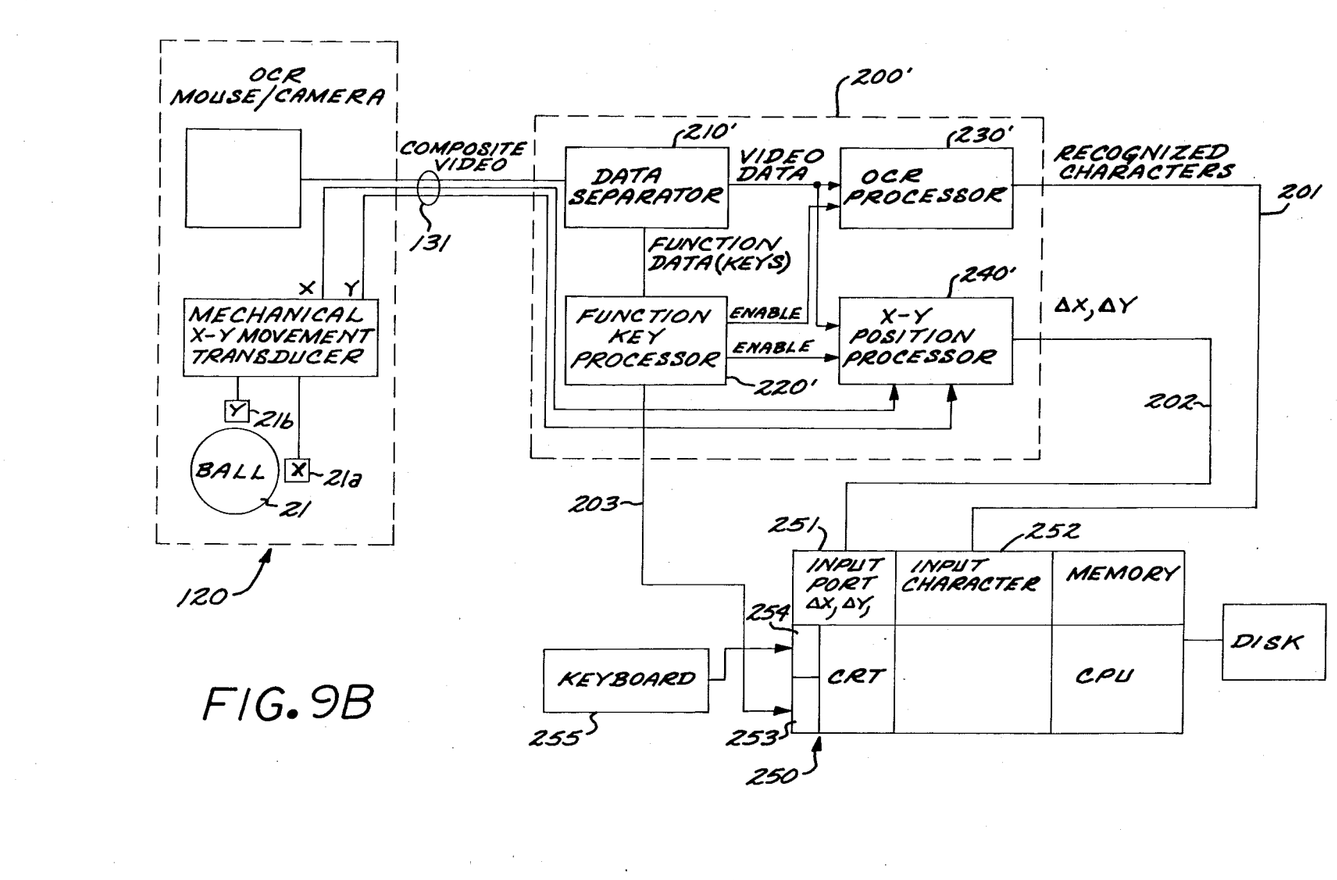
FIG. 9B is a block diagram of a computer work station employing the first embodiment of the OCR scanner/computer mouse device shown in FIGS. 1-3.

Computer terminal systems respectively employing the two disclosed embodiments of the invention are shown in the general block diagrams of FIGS. 9A and 9B, the system of FIG. 9A employing the OCR scanner/computer mouse device described with respect to FIGS. 4-8, and the system of FIG. 9B employing the device described with respect to FIGS. 1-3. Referring first to FIG. 9A, the hand-held scanner/mouse device 120 is connected via its umbilical cord 131 to a controller module 200. The scanner device 120 provides composite video information comprising successive frames of image data captured by the image transducer and associated scanner/mouse device "housekeeping" or status data, such as the status of the respective camera function keys to module 200.

The controller module comprises a data separator 210, a function key processor 220, an OCR processor 230, and X-Y position processor 240. The data separator receives the composite video data from the scanner 120 and separates the image data and the function key status data, sending the image data to the OCR processor 230 and to the X-Y position processor 240, and the function key status data to the function key data processor 220. Based on the status of one or more of the function keys, e.g., whether the OCR or X-Y movement (mouse) function is selected, the processor 220 enables the operation of either the OCR processor 230 or the X-Y position processor 240. When in the OCR mode, the processor 230 operates on the image data to provide data indicative of recognized characters on line 201. When in the computer mouse mode of operation, the processor 240 operates on the data from separator 210 to provide data indicative of scanner movements in the X and Y directions on line 202. The processor 240 performs the optical position correlation functions described with respect to the system shown and described in U.S. Pat. No. 4,521,772.

Computer work station 250 includes a CRT and CPU, with respective input ports 251, 252 for the character data on line 201 and the X, Y movement data on line 202. Another input port 253 receives status data on line 203 from the function key processor 220. A keyboard 255 is connected to a keyboard port 254 of the computer station 250. The computer 250 and keyboard 255 may comprise a personal computer system, such as an IBM PC/XT personal computer for example. In the disclosed system, the controller module 200 is preferably embodied in a controller circuit card received in a circuit card expansion connector of the IBM PC/XT.

As is well known, the IBM PC/XT model personal computer is an "open architecture" computer, wherein a peripheral card device may be plugged into a circuit card expansion connector, and have access to the computer data and address bus. Each circuit card connector has all the bus signals available to it, and the peripheral card device can be configured to define a unique port address or a redundant port address. Most address space defined by the system can be used by any peripheral device. The keyboard input port 253 is uniquely defined by the manufacturer, and the ports 251, 252 and 254 are defined to accept data in accordance with the same protocol as the keyboard 255 data.

In the character recognition mode, the character data received from the OCR processor 230 will be processed by computer system 250 as if the characters were produced by an operator and keyboard 255. Thus, a lookup function is performed by the OCR processor 230 to provide a keyboard code corresponding to the identified character. The $\Delta X$, $\Delta Y$ movement information received at port 251 will be processed in a manner similar to the keyboard data in that the $\Delta X$, $\Delta Y$ information will be translated into a series of left/right and up/down arrow keyboard commands.

The function key processor 220 receives data indicative of the status of the various device function keys, and is adapted to perform a look-up function when a particular key is activated by the user to provide a corresponding code at a keyboard port 253 of the computer system 250. The code is user-selected to emulate a predetermined keyboard character, symbol or function key.

The system shown in FIG. 9B employs the OCR camera/mouse device 20 of FIGS. 1-3, and is similar to that of FIG. 9A, except that X-Y movement data from the mechanical transducer is directed to the X-Y position processor 240' directly, without passing through the data separator 210'. Thus, the scanner/mouse function keys directly enable either the OCR processor 230' or X-Y position processor 240', so that the appropriate input data is provided to the computer terminal 250. The device 20 is shown diagrammatically in FIG. 9B, with ball 21 and X and Y movement transducers 21A and 21B, respectively.

Figure 10:
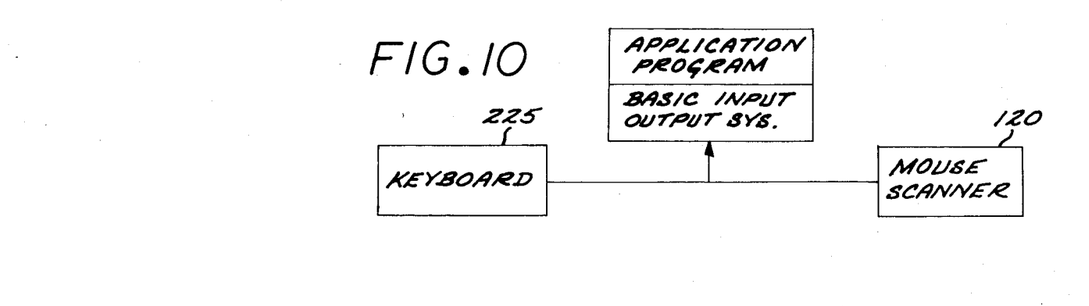
FIG. 10 is a diagrammatic view illustrative of the inter-relation of the computer system application program, its Basic Input Output System (BIOS) and the data received from the computer keyboard and the OCR scanner/computer mouse device.
Figure 11:
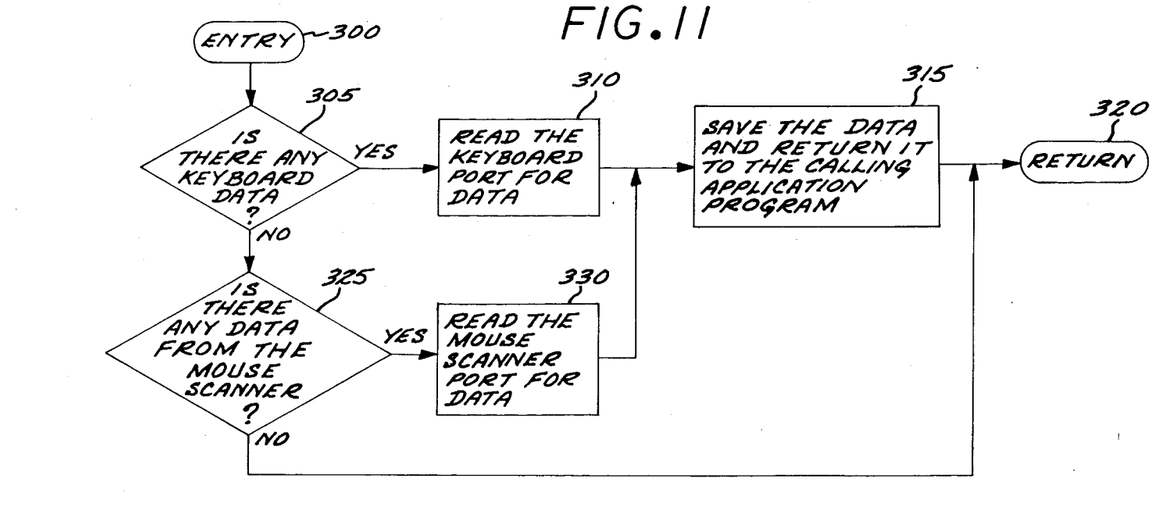
FIG. 11 is a simplified flow diagram of the operation of the BIOS employed in the systems of FIGS. 9A and 9B.

A software program is loaded into the computer system 250, and will typically reside co-resident with the computer operating system and be activated on an interrupt basis. This arrangement is generally indicated in the diagrammatic view of FIG. 10. As is well known, the Basic Input Output System (BIOS) of the computer system 250 is a software program that is typically resident in a personal computer or computer system. This program, in conjunction with the operating system, is used to direct input data to an application program with which the OCR scanner/computer mouse device is employed interactively and to output the results from the application program. Here, the BIOS directs input data from the keyboard (manually entered data such as alphabetic, symbols, numeric data, cursor control, and function codes), and directs the data to the particular application program.

Figure 12:
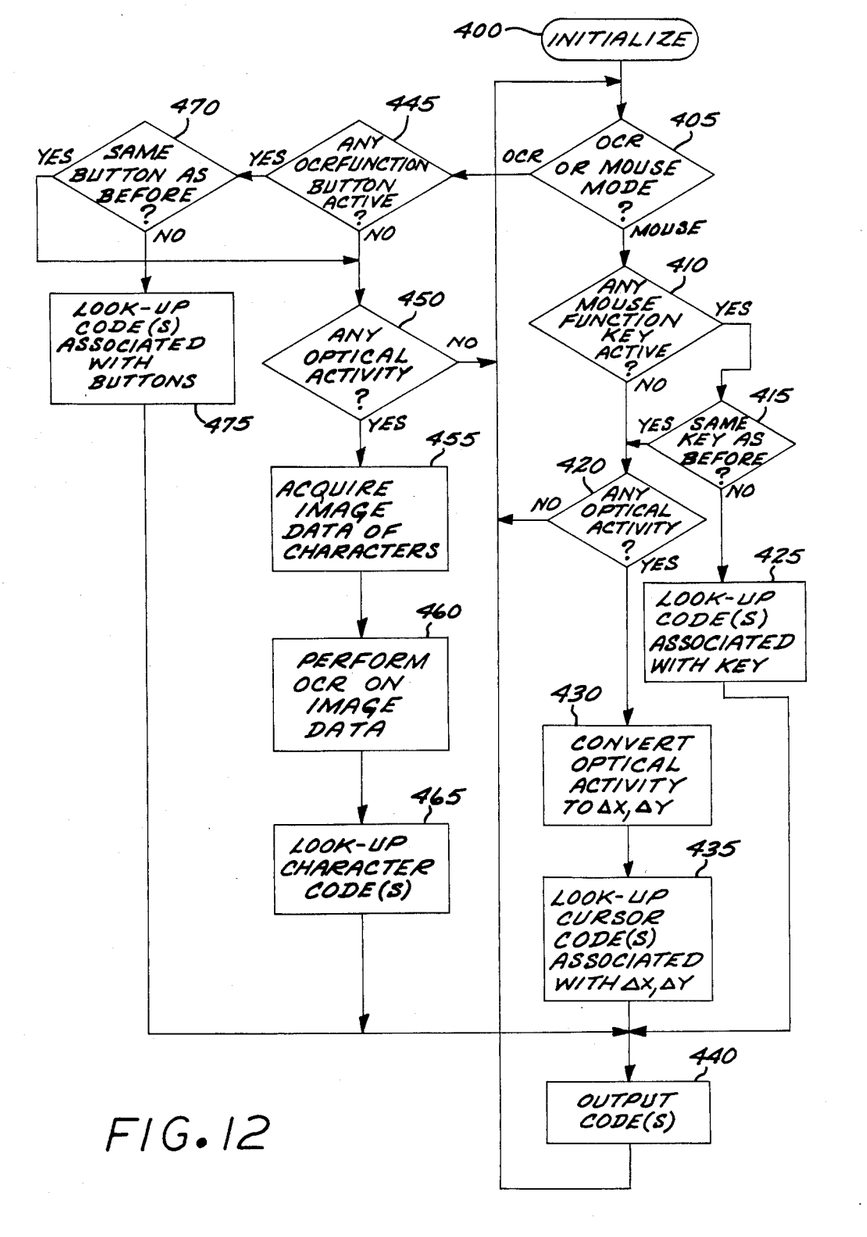
FIG. 12 is a simplified operational flow diagram of the operation of the OCR scanner/computer mouse device with the system depicted in FIG. 9A.

FIG. 12 is a simplified block diagram illustrative of the operations provided by the BIOS program when employed with the system shown in FIGS. 8A and 8B. At entry point 300, the BIOS program receives a call from the application program for data input. At step 305, a decision is made as to whether any keyboard data has been entered. If so, then at step 310, the keyboard port is read and, at step 315 the data is saved, and returned to the calling application program, and the program operation is returned at point 320 to the application program.

If there is no keyboard data at step 305, a second decision point 325 is entered to determine whether there is any data received from the scanner/mouse device 120. If not, BIOS program operation branches to return point 320 to return to the application program. If scanner/mouse data is present, then at step 330, the scanner ports 251 and 252 are read, and at step 315, the data is saved and then returned to the calling application program.

Figure 13:
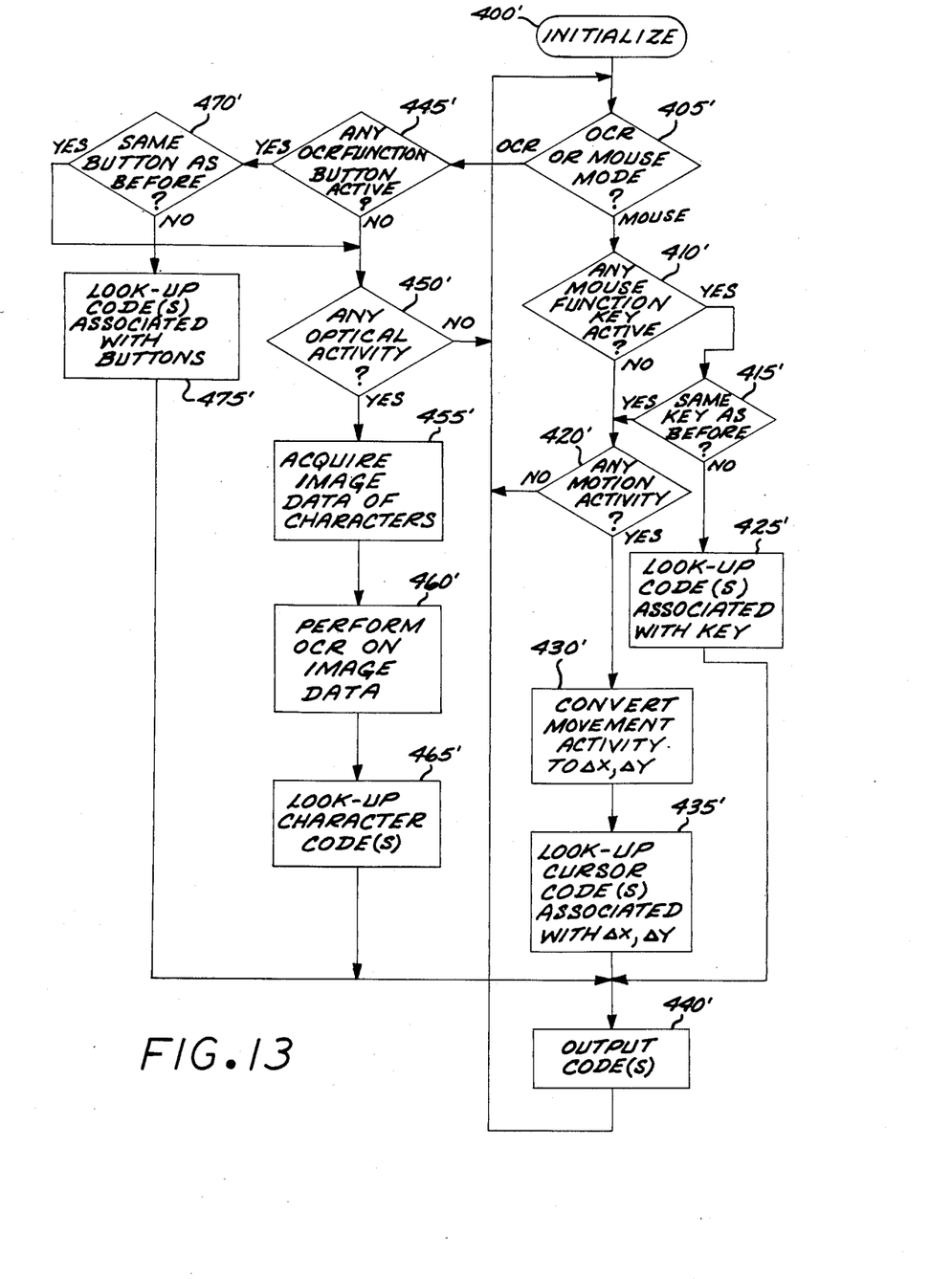
FIG. 13 is a simplied operational flow diagram of the operation of the OCR scanner/computer mouse device with the system depicted in FIG. 9B.

Referring now to FIG. 13, a flow diagram of the operation of the scanner/mouse device 120 (FIGS. 4–8) is shown. At step 400, scanner operation is initialized. At decision point 405, the system determines whether the device operator has selected the OCR or "mouse" position or mode. If the mouse mode has been selected, then at step 410, the system determines whether any mouse function keys are active. If so, at step 415 a decision is made to determine whether the same key had been active in the last program cycle, and if so, operation branches to step 420. If the key had not been active in the last cycle, then a look-up function is performed at step 425 to find the code(s) associated with the active key, the codes are output at step 440, and program operation returns to step 405.

If no mouse key was found to be active at step 410, then at step 420, a decision is made to determine if there is any detected optical sensor activity. If not, the program operation returns to step 405. If optical activity is detected at step 420, the optical data is converted to ΔX, ΔY data at step 430. At step 435, a look-up function is employed to determine the cursor codes associated with the ΔX, ΔY data. At step 440, the codes are output and scanner operation return to step 405.

Similar functions are performed if the OCR mode is selected by the operator (step 405). Any active OCR function keys are examined and their respective code(s) outputted (steps 445, 47, 475 and 440). If any optical activity is detected (step 430), then the image data is acquired (step 455), an optical character recognition function is performed on the image data (step 460), the character codes associated with the recognized characters are looked up (step 465) and the codes output at step 440.

FIG. 13 is a flow diagram of the operation of the scanner/mouse device 20 (FIGS. 1-3) employed in the system shown in FIG. 9B. The various steps set forth in FIG. 13 are identical to those in FIG. 13, except that in step 420', a determination is made as to whether any motion activity is detected from the mechanical transducer 21, 21A, 21B, and at step 430', the detected motion activity is converted to ΔX, ΔY.

It is understood that the above-described embodiments are merely illustrative of the possible specific embodiments which can represent principles of the present invention. Other arrangements may be devised in accordance with these principles by those skilled in the art without departing from the scope of the invention.

What is claimed is:

1. A combined hand-held optical scanner and X-Y movement transducer apparatus, comprising:
    (a) a housing suitable for hand-held use by an operator;
    (b) means contained within said housing for selectively optically scanning images appearing on a surface and providing electrical image signals representative of said images for image acquisition in response to a first enable signal;
    (c) means for selectively sensing the relative motion of said apparatus and providing electrical movement signals indicative of the relative motion of said housing relative to an X-Y coordinate system in response to a second enable signal; and
    (d) operator controlled function control means for selectively generating said first or second enable signal for selectively actuating only said optical scanning means or only said motion sensing means to selectively operate said apparatus in a first state wherein said hand-held apparatus is employed only in an optical scanning function or in a second state wherein said hand-held apparatus is employed only in an X-Y motion sensing function.

2. The apparatus of claim 1 wherein said optical scanning means comprises:
    (i) a light source;
    (ii) an imaging array of light sensitive detector elements for providing an electrical representation of the incident light intensity over said array; and
    (iii) means for optically directing the light produced by said light source to said surface and directing the light reflected from said surface onto said imaging array.

3. The apparatus of claim 1 wherein said X-Y motion sensing means comprises a rotatable ball for frictionally engaging said surface, means coupled to said rotatable ball for providing an X axis movement signal in dependence on the relative rotation of said ball along a predetermined X axis, and means coupled to said rotating ball for providing a Y axis movement signal in dependence on the relative rotation of said ball along a predetermined Y axis.

4. The apparatus of claim 1 wherein said motion sensing means comprises:
    a processor responsive to said function control devices and said electrical image signals, said processor comprising means for processing said electrical image signals to provide said electrical movement signals when said hand-held apparatus is employed in said second state.

5. A hand-held optical scanning apparatus, comprising:
    (a) a housing suitable for hand-held use by an operator;
    (b) optical scanning means contained within said housing for optically scanning a planar surface and providing a sequence of electrical signals representing successive images of said surface for image acquisition;
    (c) operator controlled function control devices for selectively actuating said apparatus in a first state for optical character recognition of said image data or in a second state for relative X-Y movement indication; and
    (d) a processor responsive to said function control devices and said electrical signals, said processor adapted to process the electrical signals to provide only OCR signals representative of recognized characters comprising said images when said apparatus is actuated in a first state, or to process the electrical signals to provide only movement signals indicative of the relative X-Y movement of the apparatus in relation to said surface when said apparatus is actuated in a second state.

6. A combined hand-held optical scanner and computer mouse device for use with a utilization device, comprising:
    a housing suitable for hand-held use by an operator;
    optical scanning means contained within said housing for optically scanning images appearing on a work surface adjacent a first housing surface and providing electrical image signals representative of said images for image acquisition;

X-Y movement transducer apparatus contained within said housing for providing electrical movement signals indicative of the relative motion of said housing relative to an X-Y coordinate system, said apparatus comprising a rotatable ball disposed along a second surface of said housing, means coupled to said rotatable ball for providing an X axis movement signal in dependence on the relative rotation of said ball along a predetermined X axis, and means coupled to said rotating ball for providing a Y axis movement signal in dependence on the relative rotation of said ball along a predetermined Y axis; and operator controlled function control devices for selectively enabling only said optical scanning means or only said X-Y movement transducer apparatus to selectively operate said hand-held device in a first state wherein said hand-held device is employed only in an optical scanning function or in a second state wherein said hand-held device is employed only in an X-Y motion transducing function.

* * * * *